Aug. 18, 1936.   G. J. PANNECOUCKE   2,051,314
METHOD OF MAKING WHEELS
Filed Oct. 21, 1931

INVENTOR
Gregoire J. Pannecoucke
BY Swan & Frye
ATTORNEYS

Patented Aug. 18, 1936

2,051,314

UNITED STATES PATENT OFFICE 2,051,314

METHOD OF MAKING WHEELS

Gregoire Joseph Pannecoucke, Detroit, Mich.

Application October 21, 1931, Serial No. 570,077

1 Claim. (Cl. 29—159)

This invention relates to methods of making wheels, and more particularly to wheels especially suitable for use as steering wheels and other forms of hand wheels.

An important object of this invention is the provision of an improved hand wheel formed largely of sheet metal, stamped to desired shape or cut and bent from strip in such manner as to involve literally no wastage whatever of stock.

A further object of the present invention is the production of wheels of very inexpensive and simple construction, which are especially suitable for use as automobile steering wheels, and which, despite their inexpensive construction, possess great strength and are of pleasing appearance.

Other objects and advantages will be apparent from the following description wherein reference is made to the drawing illustrating preferred embodiments of my invention, and wherein similar reference numerals designate similar parts throughout the several views.

Figure 2:
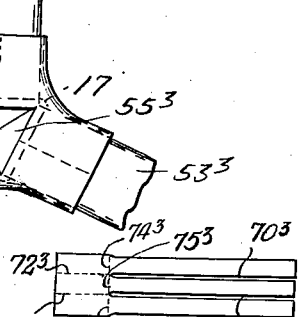
Figure 2 is a sectional view thereof taken substantially on the line 2—2 of Figure 1.
Figure 6:
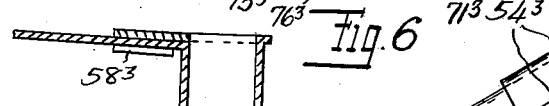
Figure 6 is a plan view of a sheet metal blank from which I may integrally form the hub and all three spokes of a somewhat modified embodiment of my invention.
Figure 4:
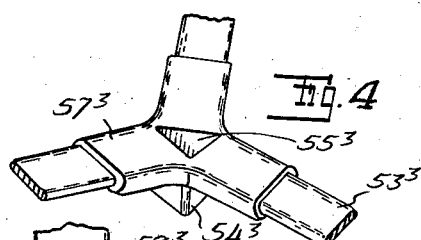
Figure 4 is a detail perspective view thereof.
Figure 3:
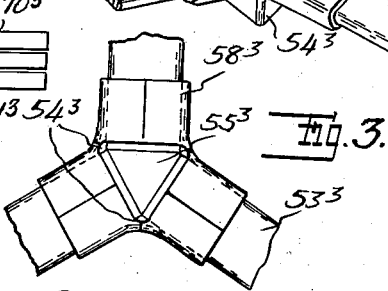
Figure 3 is a bottom plan view thereof.
Figure 5:
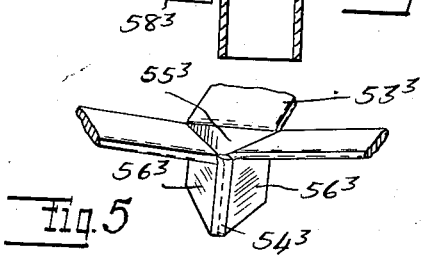
Figure 5 is a perspective view of the integral main hub portion and inner spoke ends, with the reinforcing and finishing cap removed.

A form of my invention, possessing important advantages of simplicity and inexpensiveness, yet of great strength, is shown in Figures 1 to 5 inclusive. As there shown, the spokes and hub may be integrally formed of sheet metal strips, commonly termed strap metal, the ends of which are bent downwardly to form a polygonal hub, the number of sides of which is dependent upon the number of spokes. A triangular hub is here shown, formed by turning downwardly the inner ends of the three strap metal spokes $53^3$, and welding the same along their meeting edges, as at $54^3$. The meeting edges of the downturned ends of the strap will be seen to form V-shaped grooves adapted to receive the welded metal, thereby providing a strong joint. The steering shaft aperture $55^3$ enclosed by the downturned ends $56^3$ of the spokes, may of course be drawn to any other desired contour, rather than left triangular. For example, it might be formed to cylindrical contour, and provided with a keyway, after the usual manner of forming steering wheel hubs. A more economical arrangement, however, is to form the top of the steering shaft to conform to the shape of the aperture, that is, triangular if a three spoke assembly as here shown is employed, square for a four spoke construction, etc. Additional security and bracing may be provided by a cap and securing member $57^3$, formed of relatively heavy sheet metal and adapted to cover the inner ends of the spokes, which cap is also formed with portions $58^3$, which are wrapped thereabout, as shown in Figures 2 and 3. As shown in Figure 5 the entire hub and spoke assembly might be formed of a single initially flat and rectangular sheet, stamped or sheared along the lines $76^3$—$71^3$, and then folded on the dotted lines $72^3$—$73^3$—$74^3$—$75^3$—$76^3$, to substantially the form shown in Figure 6. In this manner of forming a wheel of this type, also, as many spokes may of course be stamped from the sheet as desired, and the construction will be seen to be suitable for use in forming wheels of other types in which a greater number of spokes are required than are here shown, although but one weld is required no matter what the number of spokes.

Figure 7:
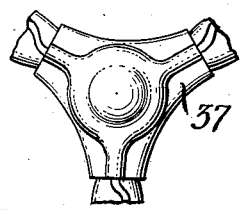
Figure 7 is a top plan view of the hub portion of the wheel showing a reinforcing and finishing cap which may be used in conjunction therewith.
Figure 1:
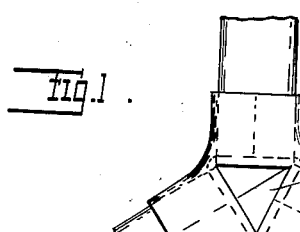
Figure 1 is a top plan view of the hub portion of a wheel made in accordance with the principles of my invention, fragmentarily showing the spoke portions.

In the wheel forms herein disclosed, with the exception of those showing wire spokes, I preferably leave the spokes bare of any molded or other like coating, finishing them merely by enameling, plating, or the like, and providing the annular rim reinforcing member alone with some such molded coating. The hubs I preferably finish by providing the same with an ornamental sheet metal cap or the like, which may also serve as a reinforcing member for the hub, as shown in Figure 7. This is of course optional, and the hubs might also be enclosed in an initially plastic molded coating if desired, or the entire wheel might be so coated.

The wheel constructions herein shown and described will be seen to be readily adaptable to other than hand wheel uses, and the great strength inherent in the manner in which the spokes and hub are joined, as well as the inexpensiveness of these wheel structures, renders them eminently practical for use in the manufacture of wheels, pulleys and the like which may be subjected to heavy loads.

While it will be apparent that the illustrated embodiments of my invention herein disclosed are well calculated to adequately fulfill the objects and advantages set forth, it is to be understood that the invention is susceptible to variation, modification and change within the spirit and scope of the subjoined claim.

What I claim is:

The method of forming a sheet metal wheel which comprises stamping a plurality of elongated substantially flat and straight strips, laterally bending to a right angle an end portion of each strip, assembling and securing the strip with the unbent portions in substantially radial relation with respect to a common axis and with said bent portions in direct abutting engagement with one another to form a prismatic enclosure, and welding together the abutting edges of said bent portions to form a spider having a prismatic hub.

GREGOIRE J. PANNECOUCKE.